(12) United States Patent
Wang et al.

(10) Patent No.: US 9,543,996 B2
(45) Date of Patent: Jan. 10, 2017

(54) METHOD AND SYSTEM FOR INITIALIZING RF MODULE THROUGH NON-VOLATILE CONTROL

(71) Applicants: Rohm Co., Ltd., Kyoto (JP); Tsinghua University, Beijing (CN)

(72) Inventors: Yiqun Wang, Beijing (CN); Yongpan Liu, Beijing (CN); Huazhong Yang, Beijing (CN); Xiao Sheng, Beijing (CN); Zewei Li, Beijing (CN); Tongda Wu, Beijing (CN); Zhongjun Wang, Kyoto (JP); Takashi Naiki, Kyoto (JP); Koji Taniuchi, Kyoto (JP)

(73) Assignees: Rohm Co., Ltd., Kyoto (JP); Tsinghua University, Beijing (CN)

( * ) Notice: Subject to any disclaimer, the term of this patent is extended or adjusted under 35 U.S.C. 154(b) by 0 days.

(21) Appl. No.: 14/830,002

(22) Filed: Aug. 19, 2015

(65) Prior Publication Data
US 2016/0056847 A1    Feb. 25, 2016

(30) Foreign Application Priority Data

Aug. 19, 2014  (CN) .......................... 2014 1 0408765
Jul. 7, 2015   (CN) .......................... 2015 1 0395055

(51) Int. Cl.
*H04B 1/04*   (2006.01)
*H04B 1/16*   (2006.01)
*G06F 3/06*   (2006.01)

(52) U.S. Cl.
CPC .......... *H04B 1/1615* (2013.01); *G06F 3/0619* (2013.01); *G06F 3/0632* (2013.01); *G06F 3/0679* (2013.01)

(58) Field of Classification Search
CPC ............................. G06F 12/0246; G06F 3/069
USPC ...................... 711/103; 455/91, 115.1, 127.1
See application file for complete search history.

(56) References Cited

U.S. PATENT DOCUMENTS

| | | | | |
|---|---|---|---|---|
| 8,369,846 | B2* | 2/2013 | Rosenblatt | H04W 12/06 455/411 |
| 8,984,209 | B2* | 3/2015 | Miura | G06F 12/0246 711/103 |
| 2003/0109218 | A1* | 6/2003 | Pourkeramati | H04W 28/14 455/3.05 |
| 2006/0023500 | A1* | 2/2006 | Kawabata | G11C 7/1051 365/185.01 |

* cited by examiner

*Primary Examiner* — Sonny Trinh
(74) *Attorney, Agent, or Firm* — Fish & Richardson P.C.

(57) ABSTRACT

Provided are a method and a system for initializing an RF module through non-volatile control, including: storing, by a non-volatile storage array, configuration information for initializing the RF module, and backing up the configuration information when receiving a power-down instruction (S1); and reading, by an RF module initialization accelerator, the configuration information from the non-volatile storage array when receiving a power-up instruction, and transmitting the read configuration information to the RF module, thereby initializing the RF module (S2). With the technical solution given in the present invention, the initialization of an RF module becomes much faster, and the power consumption of a wireless communication terminal can be reduced. In addition, the initialization of various RF modules can be supported, and meanwhile the hardware resources can be saved, thereby enhancing the extensibility of the system.

10 Claims, 10 Drawing Sheets

METHOD AND SYSTEM FOR INITIALIZING RF MODULE THROUGH NON-VOLATILE CONTROL

This application is based on Chinese Patent Application No. 201410408765.9 filed on Aug. 19, 2014, and No. 201510395055.1 filed on Jul. 7, 2015 the contents of which are hereby incorporated by reference.

BACKGROUND OF THE INVENTION

1. Field of the Invention

The present invention relates to the field of a wireless communication technology, and more particularly, to a system for initializing an RF module through non-volatile control and a method of initializing an RF module through non-volatile control.

2. Description of Related Art

With the emergence of Mobile Internet and Internet of Things, wireless communication has become an important channel for acquiring and transmitting information in our daily life. One or more RF transceivers (more generally referred to as RF modules herein), like the RF front-ends for Wi-Fi, Bluetooth, ZigBee, 3G and LTE, are necessarily integrated in a wireless communication terminal such as in a mobile device or an Internet of Things node. In order to enable a wireless communication terminal to provide high quality of service (QoS) under different channel conditions, its RF module usually requires to operate with relatively high power accounting for a large proportion of the total power consumption of a terminal. On the other hand, it is a trend that wireless communication terminals need to be smaller and cheaper, and thus their energy storage capacity becomes constrained. Some terminals adopt the energy harvesting scheme like solar energy and vibration energy to overcome the energy limitation problem. In this case, however, due to the fact that the energy generated from an energy harvester is easily subject to the change of environments, the terminals are expected to be of high power efficiency and preferably be able to remain operational under insufficient power supply or even under frequent occurrences of power interruption. For saving energy, in practice, the power hungry RF module need to be shut down frequently and waken up at certain time only when necessary. Specifically, the wake-up of an RF module needs an initialization process, which restores its configuration information and the data buffer before moving to normal transmission and reception operations.

In a conventional wireless communication terminal, the RF module initialization process is performed by a software scheme running on a processor, and in this method the processor itself requires to be initialized prior to RF module's initialization process. This conventional method leads to a large time overhead with increased power consumption, and is thus unfavorable or even not workable when an RF module needs to be frequently turned on and off, particularly when a terminal relies on the power supply from energy harvesting.

SUMMARY OF THE INVENTION

The present invention solves a problem of how to save data before a power-down happens and re-configure an RF module at high speed after power-up, thereby reducing the time overhead and energy consumption required for initialization.

In order to solve the above-mentioned problem, one embodiment of the present invention provides a method of initializing an RF module through non-volatile control, including:

storing, by a non-volatile storage array, configuration information for initializing the RF module, and backing up the configuration information when receiving a power-down instruction (S1); and reading, by an RF module initialization accelerator, the configuration information from the non-volatile storage array when receiving a power-up instruction, and transmitting the read configuration information to the RF module, thereby initializing the RF module (S2).

One embodiment of the present invention further provides a system for initializing an RF module through non-volatile control, including: a non-volatile storage array configured to store configuration information for initializing the RF module, and back up the configuration information when receiving a power-down instruction; a reconfigurable RF module controller configured to read the configuration information from the non-volatile storage array when receiving a power-up instruction, and transmit the read configuration information to a front-end interface circuit; and the front-end interface circuit configured to transmit the configuration information to the RF module based on a given communication protocol, thereby initializing the RF module.

It is preferred that the non-volatile storage array be a non-volatile memory or a non-volatile register array, and the non-volatile register array include a plurality of non-volatile flip-flops and one non-volatile read/write controller.

It is preferred that the non-volatile read/write controller be configured to determine, when receiving a power-down instruction, a plurality of non-volatile flip-flops that are assigned to back up the configuration information based on a data amount and/or complexity of the configuration information, and transmit the control signals in a predetermined time sequence to the assigned non-volatile flip-flops, thereby enabling the assigned non-volatile flip-flops to back up the configuration information.

It is preferred that the reconfigurable RF module controller include: a non-volatile FPGA configured to be programmed based on the type of a target RF module required to be initialized so that the front-end interface circuit used and the target RF module correspond to each other; and a non-volatile programming information memory configured to store programming information for the non-volatile FPGA, back up the programming information when receiving a power-down instruction, and restore the programming information when receiving a power-up instruction.

It is preferred that the front-end interface circuit include: a data buffer configured to store the transmission or reception data sent to or read from the RF module; and a staticizer. The staticizer includes: a frequency divider configured to generate the clock for a serial port and an input/output shifter from a system clock; the input/output shifter configured to generate serial or parallel data signals; and a timing controller configured to synchronize the data and clock at the serial port and shape the waveforms of data signals complying with a given communication protocol.

It is preferred that the system for initializing an RF module through non-volatile control further include a processor configured to write the configuration information to the non-volatile storage array based on a received write instruction, activate or stop the reconfigurable RF module controller based on a received activation instruction or a received stop instruction, and control the reconfigurable RF module controller based on a received control instruction so that the reconfigurable RF module controller performs a transmission operation or a reception operation.

It is preferred that the system for initializing an RF module through non-volatile control further include an RF module selector configured to transmit a selection signal to the reconfigurable RF module controller based on a selection instruction from the processor so that the reconfigurable RF module controller reads target configuration information from the non-volatile storage array and initializes a target RF module.

Further, it is preferred that the reconfigurable RF module controller be configured to control the front-end interface circuit to read data from the RF module and store the acquired data in the non-volatile storage array.

Further, it is preferred that the front-end interface circuit be configured to be able to switch to use a type of front-end interface based on the target configuration information so that the type of front-end interface used corresponds to the target RF module.

Through the above-mentioned solution, without the need for the processor to generate the configuration information anew for initialization, it is possible to initialize the RF module by backing up the configuration information for initializing the RF module before the power of the system is down and restoring the configuration information at high speed after the power is up. With this configuration, the initialization of an RF module becomes much faster, and the power consumption of a wireless communication terminal is reduced. In addition, the initialization of various RF modules can be supported while the hardware resources are saved through hardware sharing, thereby enhancing the extensibility of the system.

Features and advantages of the present invention can be understood more clearly by referring to the drawings, but the drawings are schematic, and should not be understood as some kind of limitation to the present invention.

DETAILED DESCRIPTION OF PREFERRED EMBODIMENTS

Now, the present invention is described in more detail with reference to the drawings in order to allow for a clearer understanding of the objectives, features, and advantages of the present invention. It is to be noted that the embodiments of the present invention may be combined with each other and the features of the present invention may be combined with each other as long as such a combination does not cause a contradiction.

In the following description, details are described specifically and particularly in order to allow for a sufficient understanding of the present invention, but the present invention may be carried out by using another mode different from that of the description given herein. Accordingly, the scope of protection of the present invention is not subject to the limitation of a specific embodiment to be disclosed herein below.

Figure 1:
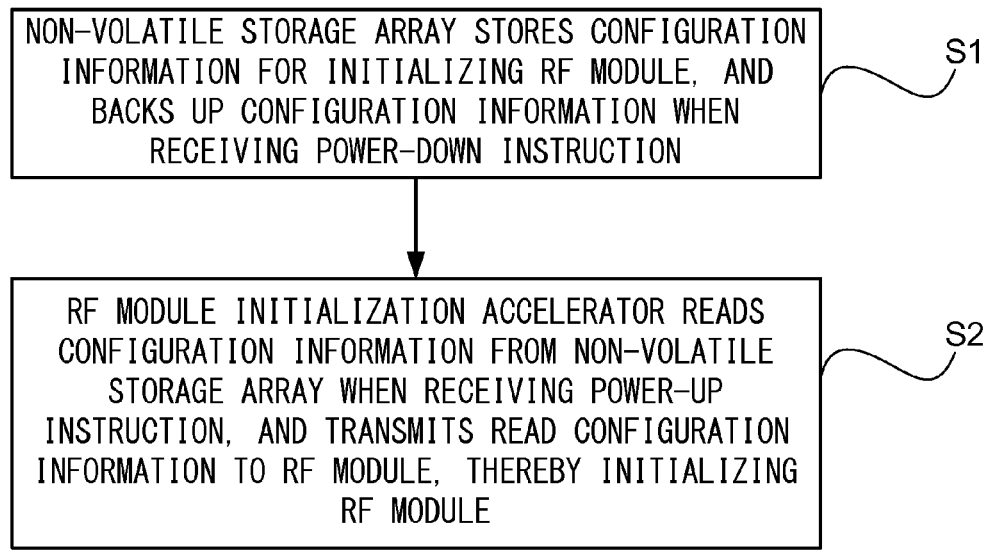
FIG. 1 is a flowchart for schematically illustrating a method of initializing an RF module through non-volatile control according to one embodiment of the present invention.

As illustrated in FIG. 1, a method of initializing an RF module according to one embodiment of the present invention includes: storing, by a non-volatile storage array, configuration information for initializing the RF module, and backing up the configuration information when receiving a power-down instruction (S1); and reading, by an RF module initialization accelerator, the configuration information from the non-volatile storage array when receiving a power-up instruction, and transmitting the read configuration information to the RF module, thereby initializing the RF module (S2).

Figure 2A:
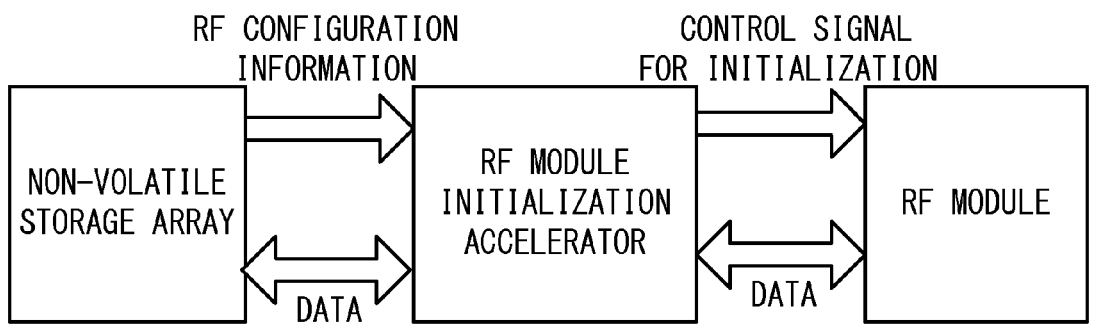
FIG. 2A is a schematic diagram for illustrating a configuration of a system for initializing an RF module through non-volatile control according to the one embodiment of the present invention.

As illustrated in FIG. 2A, the RF module according to this embodiment can be initialized through the RF module initialization accelerator. First, the non-volatile storage array transmits specific configuration data to the RF module initialization accelerator, and then the RF module initialization accelerator transmits specific initialization read/write control data to a relevant RF module, thereby initializing the relevant RF module.

Note that, the non-volatile storage array and the RF module initialization accelerator forms one RF module initialization system, and the thus formed RF module initialization system performs the initialization of the RF module.

Figure 2B:
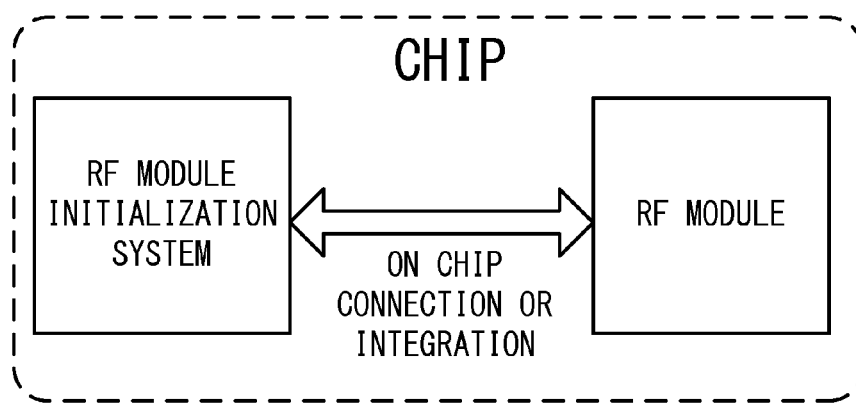
FIG. 2B is a schematic diagram for illustrating a configuration of the system for initializing an RF module through non-volatile control according to the one embodiment of the present invention.

As illustrated in FIG. 2B, the RF module initialization system according to the one embodiment of the present invention and a specific RF module to be initialized may be integrated in a single chipset. In this case, the initialization system and the RF module can communicate with each other through high-speed internal connections, thereby achieving fast initialization of the RF module.

Figure 2C:
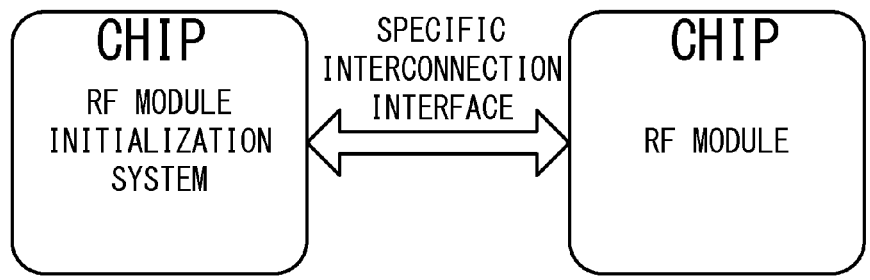
FIG. 2C is a schematic diagram for illustrating a configuration of the system for initializing an RF module through non-volatile control according to the one embodiment of the present invention.

As illustrated in FIG. 2C, the RF module initialization system according to the one embodiment of the present invention and the RF module may be mounted separately on two chips, and the two chips are connected to each other through a specific configuration. Such a connection configuration can assist the one RF module initialization system in initializing a plurality of RF module chips, thereby making the initialization operation more flexible.

Figure 3:
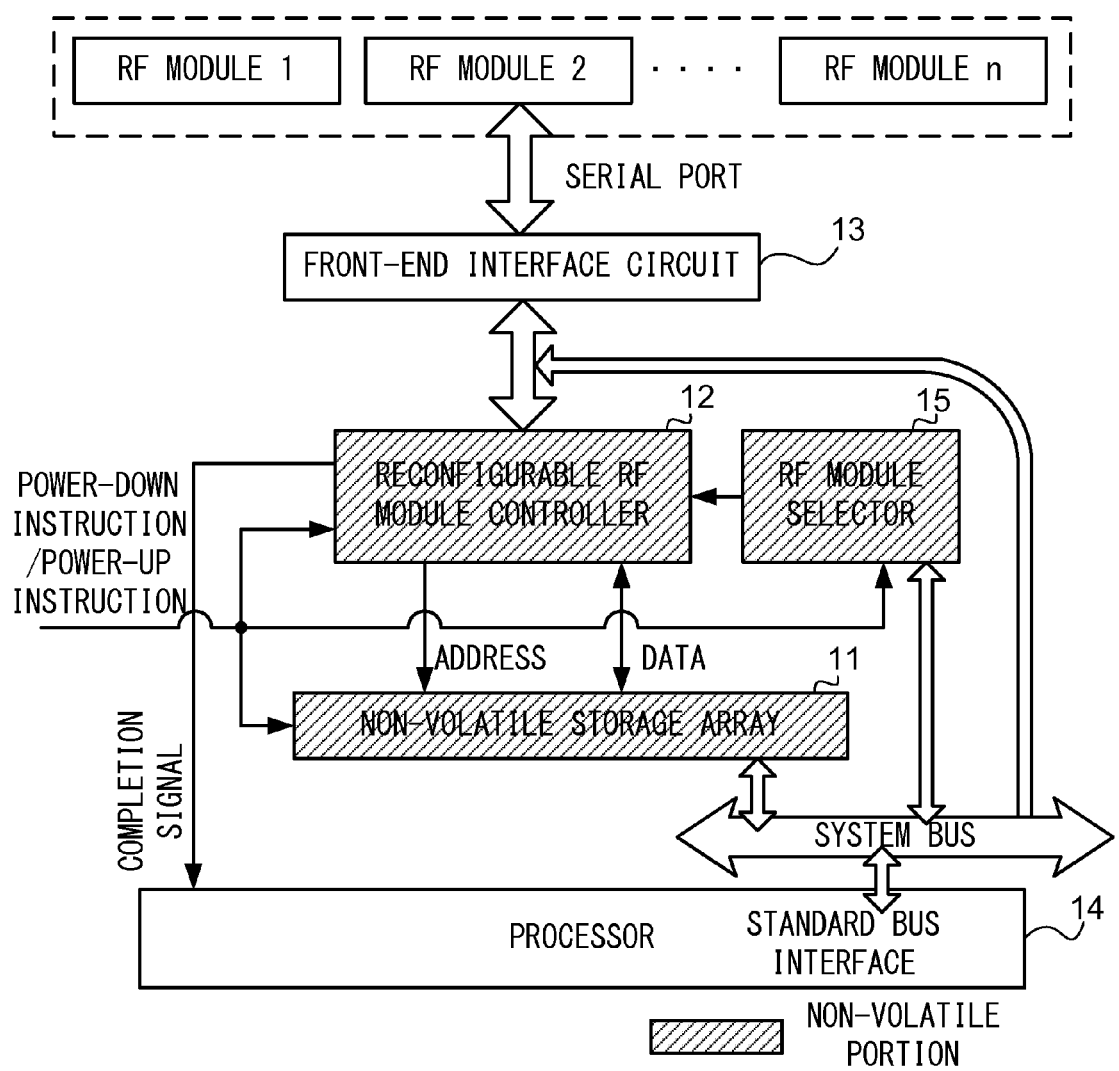
FIG. 3 is a schematic diagram for illustrating a specific configuration of the system for initializing an RF module through non-volatile control according to the one embodiment of the present invention.

As illustrated in FIG. 3, the system for initializing an RF module through non-volatile control according to the one embodiment of the present invention specifically includes: a non-volatile storage array 11 configured to store the configuration information for initializing the RF module, and back up the configuration information when receiving the power-down instruction; a reconfigurable RF module controller 12 configured to read the configuration information from the non-volatile storage array when receiving the power-up instruction, and transmit the read configuration information to a front-end interface circuit 13; and the front-end interface circuit 13 configured to transmit the configuration information to the RF module based on a given communication protocol, thereby initializing the RF module.

Note that, specifically, the non-volatile storage array 11 provides the configuration information to the RF module for its initialization through the reconfigurable RF module controller 12, which is the hardware based. The hardware driven access to the RF module is desirable for fast initialization.

Specifically, a plurality of RF modules may be initialized, and the RF modules may be of the same type or different types. The system further includes a processor 14 and an RF module selector 15, in addition to the non-volatile storage array 11, the reconfigurable RF module controller 12, and the front-end interface circuit 13. The reconfigurable RF module controller 12, the front-end interface circuit 13, and the RF module selector 15 according to this embodiment together can implement a relevant function of the RF module initialization accelerator of FIG. 2A.

It is preferred that the non-volatile storage array 11 be a non-volatile memory or a non-volatile register array, and that the non-volatile register array include a plurality of non-volatile flip-flops and one non-volatile read/write controller.

It is preferred that the non-volatile read/write controller be configured to determine, when receiving a power-down instruction, the plurality of non-volatile flip-flops that are assigned to back up the configuration information based on a data amount and/or complexity of the configuration information, and transmit the control signals in a predetermined time sequence to the assigned non-volatile flip-flops, thereby enabling the assigned non-volatile flip-flops to back up the configuration information.

The non-volatile storage array 11 may be accessed through byte addressing, and the size and architecture thereof are determined based on the requirement of an actual application and the type of RF module to be used. In a wireless sensor network application, for example, where the 8-bit C8051 is selected as the processor and the Zigbee-compliant TI-CC2420 is selected as the RF module, the required amount of configuration information and the size of a data packet in a single frame are known to be not large. In this case, the non-volatile storage array 11 can be configured to have a bit-width of 8 bits and an address-width of 7 bits to 8 bits, resulting in a storage space of 128 bytes or 256 bytes. The non-volatile storage array 11 can be divided into two address spaces—a lower address space stores the configuration information of the RF module, and a higher address space stores data packets. Considering the fact that the required amount of configuration information is small for most of RF modules, like 16 bytes to 18 bytes for the TI-CC2420 module, it is preferred that the storage space to be allocated to the configuration information be 32 bytes, while the remaining space is allocated to data packets.

Figure 4:
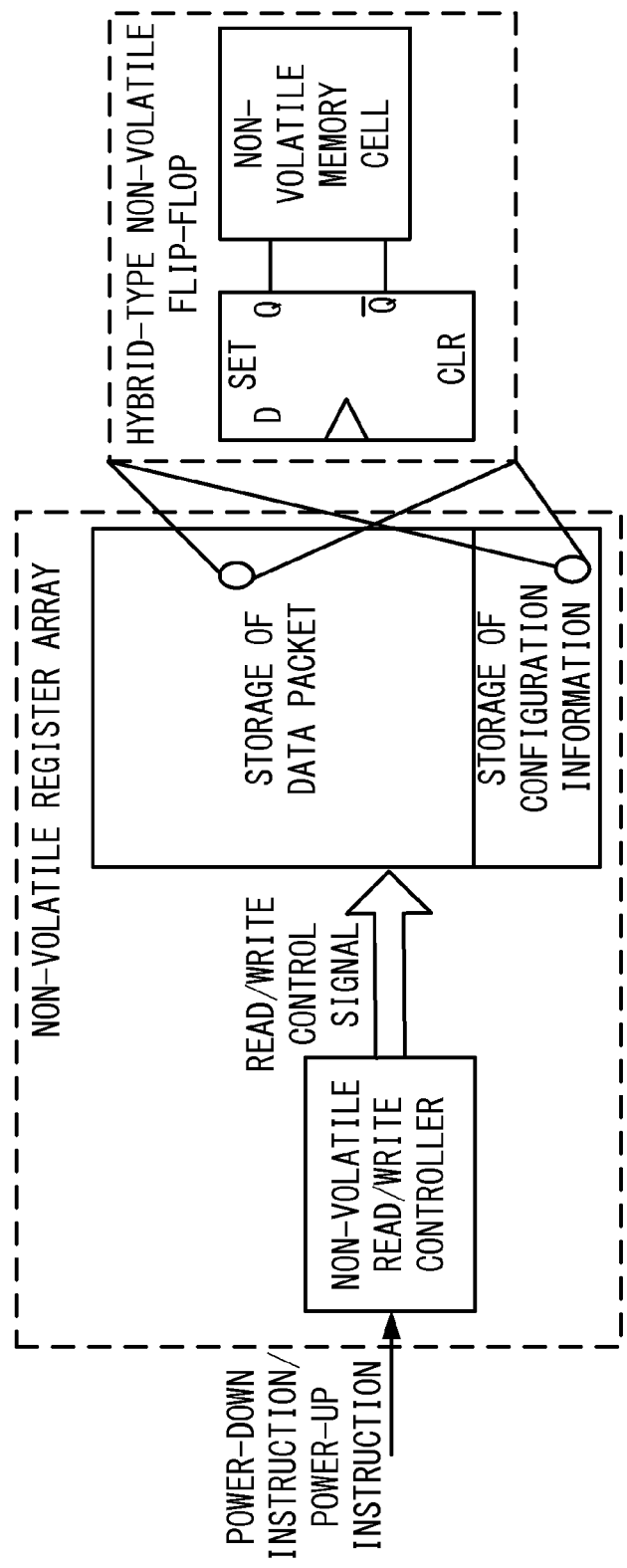
FIG. 4 is a schematic diagram for illustrating a configuration of a non-volatile storage array according to the one embodiment of the present invention.

When the non-volatile storage array 11 is the non-volatile register array, this non-volatile register array is composed of the plurality of non-volatile flip-flops and the one non-volatile read/write controller. A specific configuration of the non-volatile register array is illustrated in FIG. 4. A non-volatile flip-flop is realized with a hybrid circuit structure consisting of a common master-slave flip-flop and a non-volatile memory cell. All of the flip-flops are controlled by the one non-volatile read/write controller with parallel operations when performing data backup before power-down and data recovery after power-up. The non-volatile read/write controller is a finite state machine which, upon receiving a power-down or power-up instruction, will generate a read or write control signal in a specific time sequence for the non-volatile flip-flops to perform their data backup or recovery operations.

The non-volatile storage array 11 may also be a flash memory, a ferroelectric random-access memory, a magnetoresistive random-access memory, or the like. The non-volatile storage array 11, with the form of either a standalone non-volatile memory or a non-volatile register array, has the non-volatile feature, and hence even after a power-down, data saved to the non-volatile storage array 11 will not be lost, and when the power is up again, an operation can be resumed after directly restoring the data saved before. With this, it is possible to initialize the RF module at high speed, thereby enabling the RF module to operate stably under the condition of frequent occurrences of power interruption, and achieving rapid shut-down (power-down) and wake-up (power-up) with reduced energy consumption for these operations.

Figure 5:
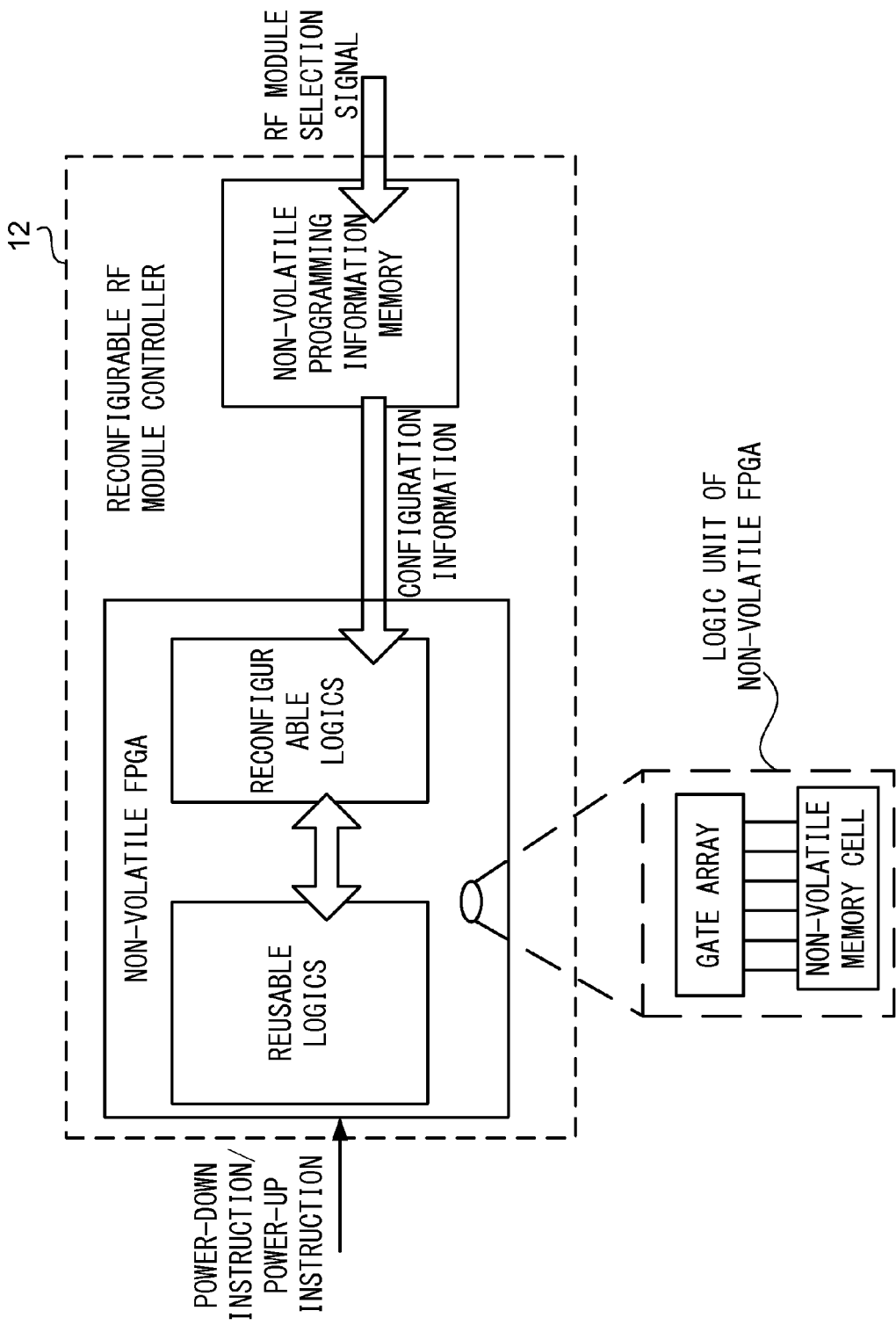
FIG. 5 is a schematic diagram for illustrating a configuration of a reconfigurable RF module controller according to the one embodiment of the present invention.

It is preferred that the reconfigurable RF module controller 12 include, as illustrated in FIG. 5: a non-volatile FPGA configured to be programmed based on the type of a target RF module required to be initialized so that the front-end interface circuit 13 used and the target RF module correspond to each other; and a non-volatile programming information memory configured to store programming information for the non-volatile FPGA, back up the programming information when receiving a power-down instruction, and restore the programming information when receiving a power-up instruction.

The reconfigurable RF module controller 12 changes its control circuits in adaptation to the type of RF module used outside, thereby implementing a hardware initialization function for the RF module. Specifically, the reconfigurable RF module controller 12 is formed of one non-volatile FPGA and the non-volatile programming information memory (e.g., EEPROM). Note that, the non-volatile FPGA may be a chip, or may be a specific circuit module. The programming information can also be restored from the non-volatile programming information memory at high speed upon the power-up after a power-down, and hence the front-end interface circuit 13 is selected at high speed, thereby further accelerating the initialization of the RF module.

The reconfigurable RF module controller 12 is capable of dynamically selecting the relevant control circuits based on the type of RF module used outside, thereby implementing the hardware initialization function for various RF modules. Note that, the FPGA can flexibly be re-programmed for a new RF module, and hardware resources can be reduced significantly because the FPGA is reconfigurable. In this case, the non-volatile programming information memory is used to store the reconfigurable configuration information for different RF modules.

The controller for performing the whole initialization of a single RF module can be implemented by a finite state machine. If the TI-CC2420 RF module is used, for example, the finite state machine can execute a sequence of initialization processes including selecting communication channels, performing address decoding, setting a threshold for detecting an idle channel, activating the crystal oscillator, loading data to a baseband control FIFO (first-in-first-out) buffer, going to the state of channel sensing, and the like. For a specific RF module, its initialization procedure is fixed, and thus the controller can be implemented by a finite state machine with fixed hardware.

Further, when multiple types of RF modules are involved, one may note that, for different RF modules, most steps of their initialization procedures are same except that their related registers may adopt different addresses and configuration formats. In this context, instead of designing a separate finite state machine for each individual RF module, different finite state machines can share the use of a large portion of hardware while the rest will be designed differently. This leads to a reconfigurable design of the RF module controller, which can be easily implemented by a FPGA. The FPGA-based controller thus consists of reusable logics and reconfigurable logics. By properly using a synthesis tool for FPGA implementation, the design can be optimized in the sense that the same portion of hardware for controlling different RF modules is reused as much as possible and retained in the FPGA as reusable logics, whereas the different portion is formed with reconfigurable logics which can be configured online. In this way, the controller reads the configuration information stored in the non-volatile programming information memory to update the reconfigurable logics of FPGA when switching to use a different RF module.

In summary, through the use of FPGA, it is possible to program the FPGA for each individual RF module with flexibility, and it is also possible to significantly save hardware resources by virtue of reconfigurability. The reconfigurable configuration information for different RF modules is stored in the non-volatile programming information memory, which is of a small capacity.

Moreover, the above-mentioned FPGA can be a non-volatile FPGA. As shown in FIG. 5, the logic unit of a non-volatile FPGA contains gate arrays and non-volatile memory cells. The hardware information about the logic functions of gate arrays as well as their connections is stored in non-volatile memory cells. In this way, a non-volatile FPGA is able to maintain its whole hardware configuration after power-down. Compared with a conventional FPGA, the non-volatile FPGA can restore its hardware configuration in tens of microseconds, which is much desirable for achieving fast initialization of RF modules. The backup and recovery operations of a non-volatile FPGA are triggered by the power-down and power-up instructions, respectively.

Figure 6:
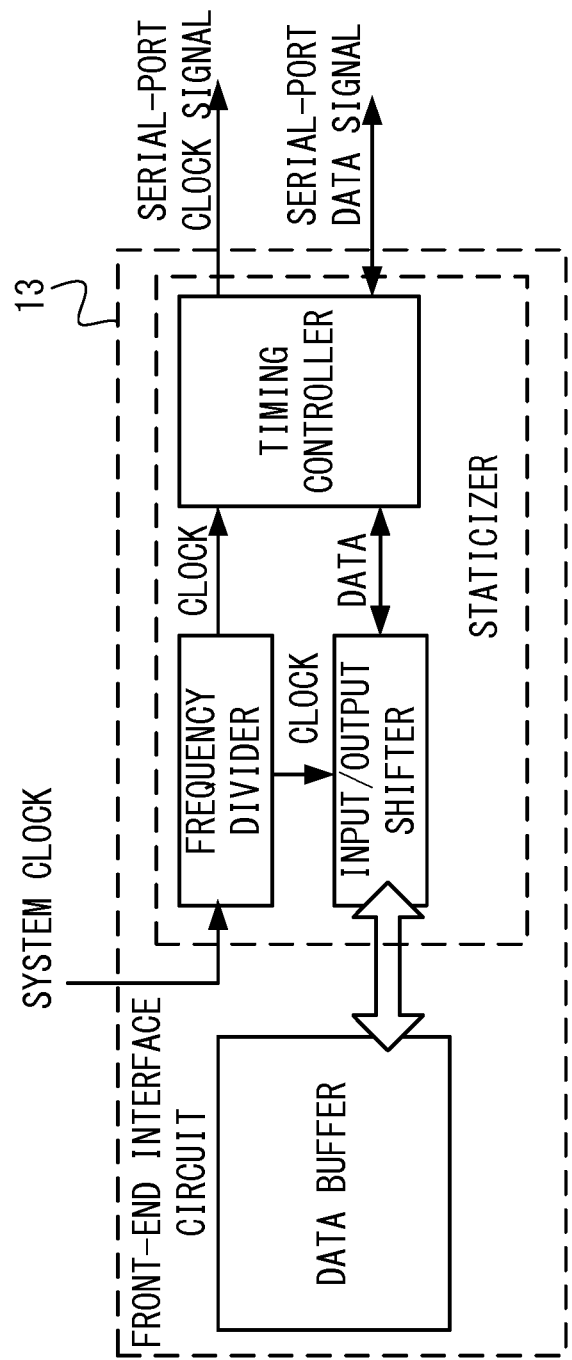
FIG. 6 is a schematic diagram for illustrating a configuration of a front-end interface circuit according to the one embodiment of the present invention.

It is preferred that the front-end interface circuit 13 include, as illustrated in FIG. 6: a data buffer configured to store RF transmission or reception data sent to or read from the RF module; and a staticizer. The data buffer is formed of a plurality of registers. The staticizer includes: a frequency divider configured to generate the clock for a serial port and an input/output shifter from a system clock; an input/output shifter configured to generate serial or parallel data signals; and a timing controller configured to synchronize the data and clock at the serial port and shape the waveforms of data signals complying with a given communication protocol.

The front-end interface circuit 13 converts the control data generated by the reconfigurable RF module controller 12 into the interface signals that are fit for the RF module. The front-end interface circuit 13 receives parallel data from the reconfigurable RF module controller 12 or the processor 14, and sends the data to the RF module using a standard communication protocol such as SPI, I2C or USB. Whichever communication protocol used is configured by the reconfigurable RF module controller 12 or the processor 14. In real applications, the initialization system can switch to use a proper type of frontend interface according to the type of RF module used.

It is preferred that the RF module initialization system further include the processor 14 configured to write the configuration information to the non-volatile storage array 11 based on a received write instruction, activate or stop the reconfigurable RF module controller 12 based on a received activation instruction or a received stop instruction, and control the reconfigurable RF module controller 12 based on a received control instruction to perform a transmission/reception operation.

The processor 14 communicates with other modules through a system bus, and the type of bus can be selected based on the type of the processor 14. For example, when C8051 or ARM CortexMx is used as the processor 14, the Wishbone bus, the AMBA bus, or the like can be selected as the system bus. The system bus at least includes address lines of 8 bits to 32 bits, data lines of 8 bits to 32 bits, and handshaking signals. The processor 14 is a master device, which is connected to the system bus through a standard bus interface, and its slave devices are the non-volatile storage array 11, the RF module selector 15, and the front-end interface circuit 13. In this case, only one slave device is allowed to communicate with a master device at a time. When the selected RF module is out of a list of types that can be configured by the reconfigurable RF module controller 12, the front-end interface circuit 13 shall act as the slave device. In this case, no fast initialization of RF module is supported, and the processor 14 takes a by-pass channel to control the front-end interface circuit 13 directly for performing data transmission/reception. On the other hand, when the selected RF module can be configured by the reconfigurable RF module controller 12, the non-volatile storage array 11 and the RF module selector 15 shall act as the slave devices. The processor 14 sends or receives data to or from the non-volatile storage array 11, and the reconfigurable RF module controller 12 further transmits or receives data to or from the RF module. In this case the wireless communication terminal supports non-volatile controlled fast initialization of RF modules.

It is preferred that the RF module initialization system further include the RF module selector 15 configured to transmit a selection signal to the reconfigurable RF module controller 12 based on a selection instruction from the processor 14 so that the reconfigurable RF module controller 12 reads target configuration information from the non-volatile storage array 11 and initializes a target RF module.

A non-volatile register configured to store the information for selecting the use of an RF module can be used as the RF module selector 15, and the RF module selector 15 can be modified and configured only through the processor 14. More specifically, the RF module selector 15 provides a selection signal to the reconfigurable RF module controller 12 for it to select its required FPGA configuration information. In this way, the control logics of FPGA can be easily configured based on a specific type of RF module.

The non-volatile register used in this case is formed of non-volatile flip-flops with a hybrid structure similar to that used in realization of the non-volatile storage array. The flip-flops are controlled by a non-volatile read/write controller to perform data backup before power-down and data recovery after power-up.

Further, it is preferred that the reconfigurable RF module controller 12 be configured to control the front-end interface circuit 13 to read data from the RF module and store the acquired data in the non-volatile storage array 11.

Further, it is preferred that the front-end interface circuit 13 be configured to be able to switch to use a type of front-end interface based on the target configuration information so that the type of front-end interface corresponds to the target RF module.

Figure 7A:
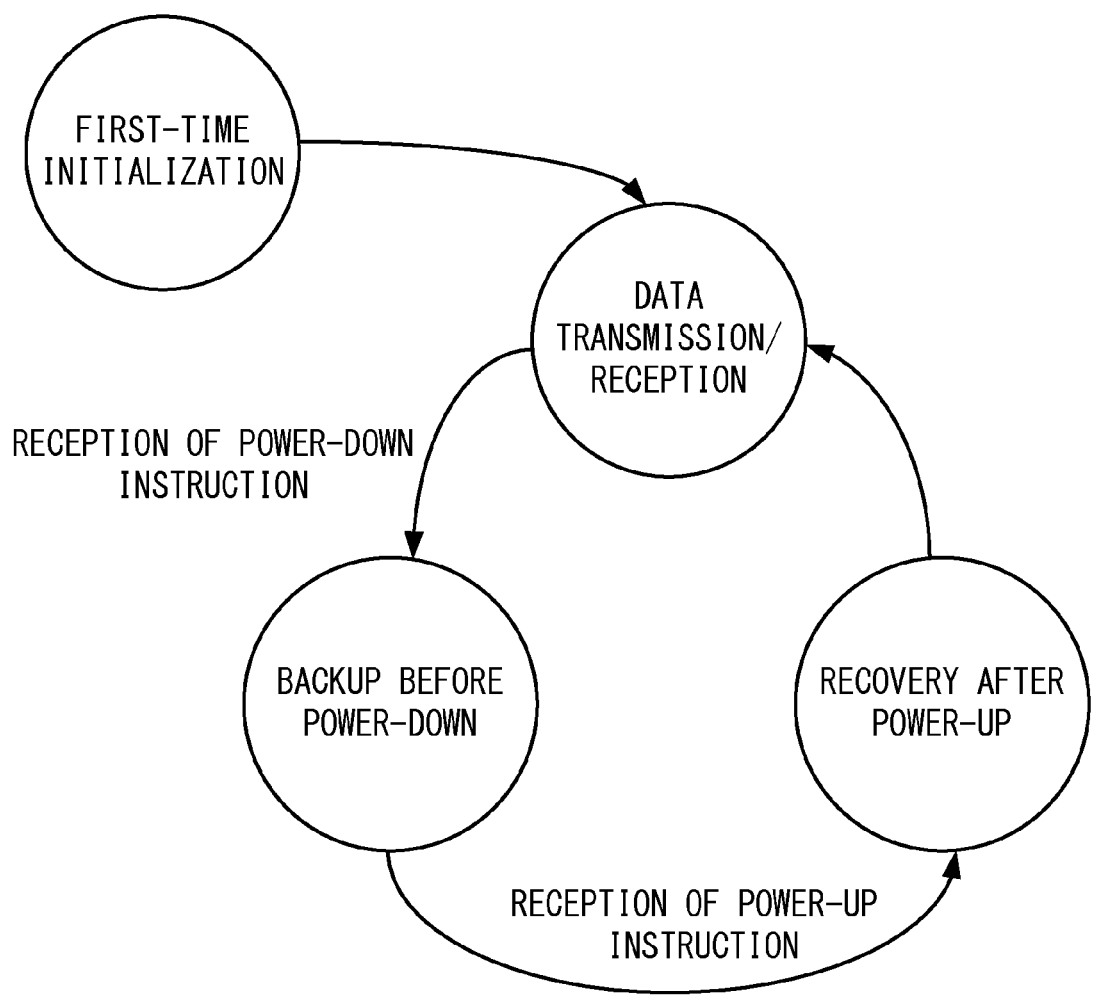
FIG. 7A is an operation flowchart for schematically illustrating the system for initializing an RF module through non-volatile control according to the one embodiment of the present invention.

A specific operation flow of the RF module initialization system is illustrated in FIG. 7A to FIG. 7D. Two operation scenarios shall be considered for initialization of a RF module. The first scenario is to configure a RF module for the first time, i.e., first-time initialization. The second scenario is to re-configure a RF module by restoring its configuration data which was lost due to power-down. FIG. 7A shows an operation flowchart of the initialization system which mainly includes four processes, namely, first-time initialization, data transmission/reception, backup before power-down and recovery after power-up. The processor 14 chooses a RF module, which will first undergo its first-time initialization and then enter into the process of data transmission/reception. The initialization system will start its backup process upon a received power-down instruction, or recovery process upon a received power-up instruction. The power-down or power-up instruction can be generated either by the processor 14 or by the related power management unit of a wireless communication terminal.

Figure 7B:
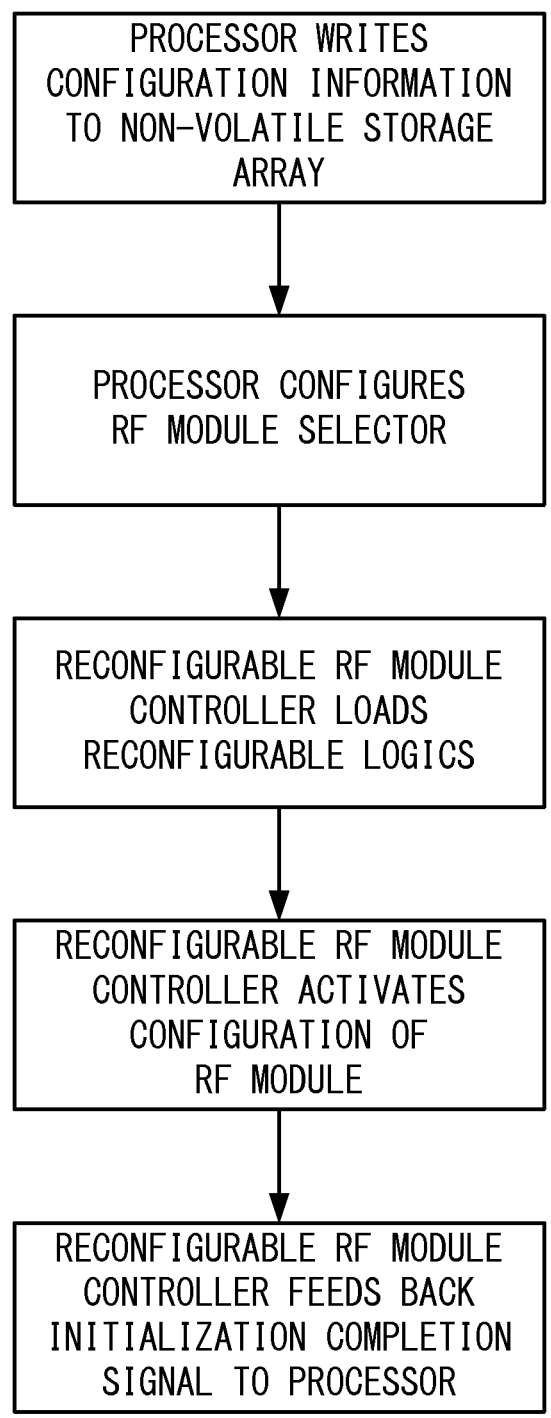
FIG. 7B is a process flowchart for schematically illustrating the system for initializing an RF module through non-volatile control according to the one embodiment of the present invention.

Specifically, as illustrated in FIG. 7B, the first-time initialization process includes the following steps. (1) The processor 14 writes RF module's configuration information to the non-volatile storage array 11 via system bus. (2) The processor 14 configures the RF module selector 15 and selects the relevant RF module. (3) The processor 14 activates the reconfigurable RF module controller 12, which first loads in its reconfigurable logics. (4) The processor 14 triggers the finite state machine of the reconfigurable RF module controller 12 to configure the selected RF module. (5) The reconfigurable RF module controller 12 generates an initialization completion signal and provides it to the processor 14.

The specific data transmission/reception process can be controlled by software or hardware. In the case of hardware-controlled data transmission/reception, the transmission/reception process is controlled by the reconfigurable RF module controller 12 with the following operations. (1) The processor 14 writes transmission data packet to or reads reception data packet from the non-volatile storage array 11 via system bus. (2) The processor 14 activates the finite state machine of the reconfigurable RF module controller 12, and the finite state machine is responsible for enabling the RF module to perform the subsequent transmission/reception operations. (3) The reconfigurable RF module controller 12 generates a transmission/reception completion signal and provides it to the processor 14.

In the case of software-controlled data transmission/reception, the processor 14 connects with the front-end interface circuit 13 directly via system bus and performs together with the RF module the transmission/reception operations.

Figure 7C:
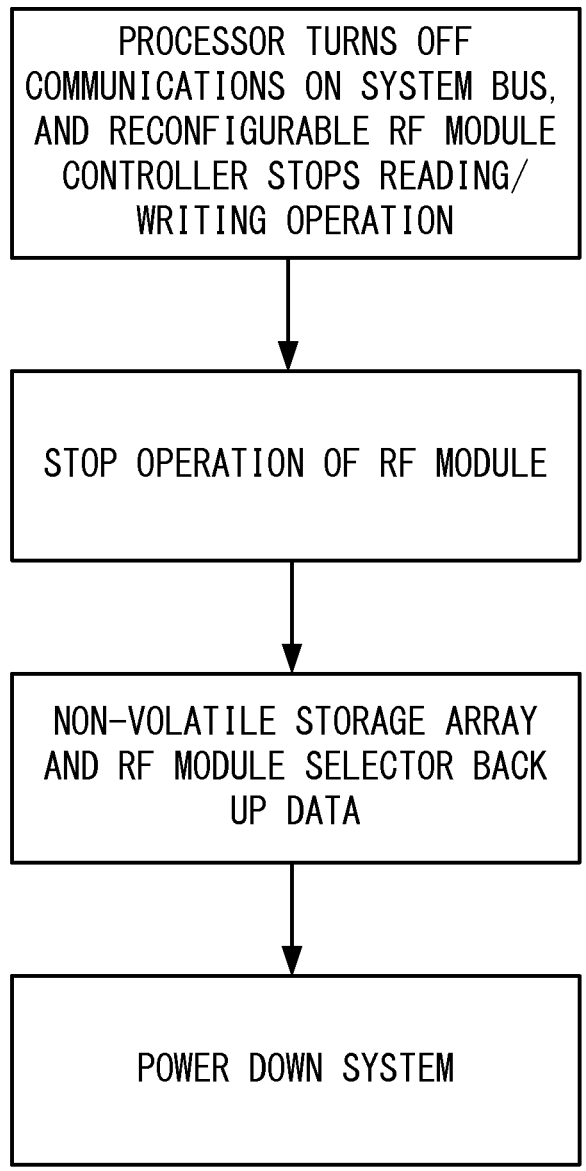
FIG. 7C is a process flowchart for schematically illustrating the system for initializing an RF module through non-volatile control according to the one embodiment of the present invention.

As illustrated in FIG. 7C, the specific backup before power-down process includes the following operations. (1) The processor 14 turns off communications running on system bus, and simultaneously the reconfigurable RF module controller 12 stops read/write access to the non-volatile storage array 11. (2) Stop the operation of the RF module. (3) Back up the data of the non-volatile storage array 11 and the RF module selector 15. (4) The system gets power-down.

Figure 7D:
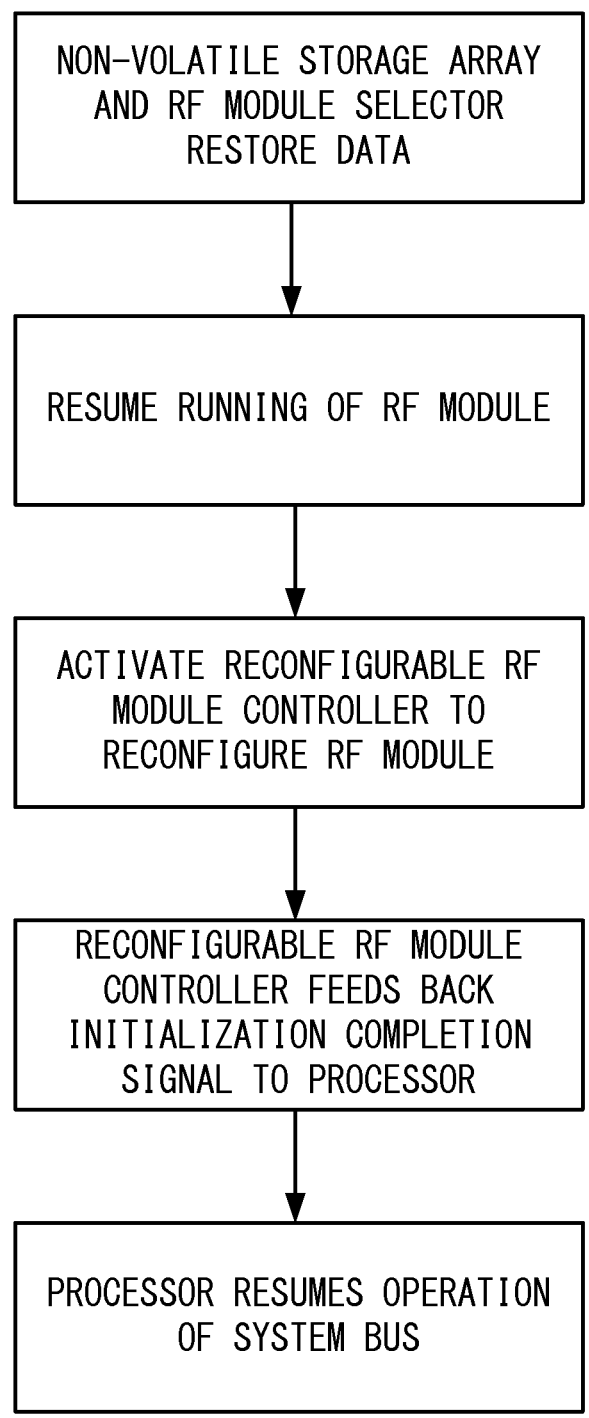
FIG. 7D is a process flowchart for schematically illustrating the system for initializing an RF module through non-volatile control according to the one embodiment of the present invention.

As illustrated in FIG. 7D, the specific recovery after power-up process includes the following operations. (1) Restore data of the non-volatile storage array 11 and the RF module selector 15. (2) Resume running of the RF module. (3) Run the reconfigurable RF module controller 12 to re-configure the RF module using the configuration information read from the non-volatile storage array 11. (4) The reconfigurable RF module controller 12 sends an initialization completion signal to the processor 14. (5) The processor 14 resumes the operation of system bus, and the RF module proceeds to the data transmission/reception process.

Figure 8:
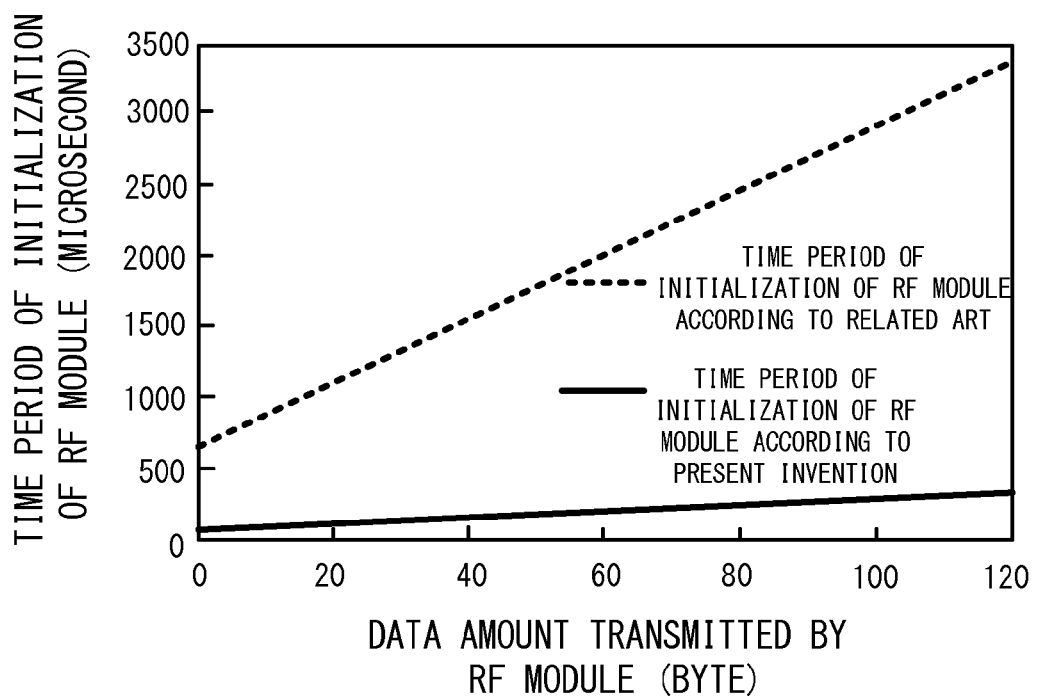
FIG. 8 is a graph for showing a comparison between a time period of initialization according to the one embodiment of the present invention and a time period of initialization according to the related art.

As shown in FIG. 8, compared with a related art (a conventional method using the processor and software based configuration), the method proposed in the present invention can achieve much faster (10 times or more) initialization of RF modules. Moreover, the proposed reconfigurable technology can be used to initialize multi-type of RF modules with a fixed yet simple hardware setup, which leads to much flexibility in deployment of wireless communication terminals and systems for a wide range of applications.

In the present invention, the term "plurality of" means "two or more" unless otherwise limited clearly.

While the embodiment of the present invention has been described with reference to the drawings, a person skilled in the art can make various changes and modifications without departing from the spirit and the scope of the present invention, and all of such changes and modifications are encompassed within the scope limited by the appended claims.

What is claimed is:

1. A system for initializing an RF module through non-volatile control comprising:
   a non-volatile storage array configured to store configuration information for initializing the RF module, and back up the configuration information when receiving a power-down instruction, wherein the non-volatile storage array includes a non-volatile register array, the non-volatile register array comprising a plurality of non-volatile flip-flops and one non-volatile read/write controller; and
   a reconfigurable RF module controller configured to read the configuration information from the non-volatile storage array when receiving a power-up instruction, and transmit the read configuration information to a front-end interface circuit, wherein the front-end interface circuit is configured to transmit the configuration information to the RF module based on a given communication protocol, thereby initializing the RF module, wherein the non-volatile read/write controller is configured to determine, when receiving the power-down instruction, a plurality of the non-volatile flip-flops that are assigned to back up the configuration information based on a data amount and/or complexity of the configuration information, and transmit the control signals in a predetermined time sequence to the assigned non-volatile flip-flops, thereby enabling the assigned non-volatile flip-flops to back up the configuration information.

2. A system for initializing an RF module through non-volatile control comprising:
a non-volatile storage array configured to store configuration information for initializing the RF module, and back up the configuration information when receiving a power-down instruction; and
a reconfigurable RF module controller configured to read the configuration information from the non-volatile storage array when receiving a power-up instruction, and transmit the read configuration information to a front-end interface circuit, wherein the front-end interface circuit is configured to transmit the configuration information to the RF module based on a given communication protocol, thereby initializing the RF module,
wherein the reconfigurable RF module controller comprises:
a non-volatile FPGA configured to be programmed based on a type of a target RF module required to be initialized so that the front-end interface circuit used and the target RF module correspond to each other; and
a non-volatile programming information memory configured to store the programming information for the non-volatile FPGA, back up the programming information when receiving the power-down instruction, and restore the programming information when receiving the power-up instruction.

3. A system for initializing an RF module through non-volatile control comprising:
a non-volatile storage array configured to store configuration information for initializing the RF module, and back up the configuration information when receiving a power-down instruction; and
a reconfigurable RF module controller configured to read the configuration information from the non-volatile storage array when receiving a power-up instruction, and transmit the read configuration information to a front-end interface circuit, wherein the front-end interface circuit is configured to transmit the configuration information to the RF module based on a given communication protocol, thereby initializing the RF module,
wherein the front-end interface circuit comprises:
a data buffer configured to store the transmission or reception data sent to or read from the RF module; and
a staticizer comprising:
a frequency divider configured to generate the clock for a serial port and an input/output shifter from a system clock;
the input/output shifter configured to generate serial or parallel signals; and
a timing controller configured to synchronize the data and clock at the serial port and shape the waveforms of data signals complying with a given communication protocol.

4. A system for initializing an RF module through non-volatile control comprising:
a non-volatile storage array configured to store configuration information for initializing the RF module, and back up the configuration information when receiving a power-down instruction;
a reconfigurable RF module controller configured to read the configuration information from the non-volatile storage array when receiving a power-up instruction, and transmit the read configuration information to a front-end interface circuit, wherein the front-end interface circuit is configured to transmit the configuration information to the RF module based on a given communication protocol, thereby initializing the RF module; and
a processor configured to write the configuration information to the non-volatile storage array based on a received write instruction, activate or stop the reconfigurable RF module controller based on a received activation instruction or a received stop instruction, and control the reconfigurable RF module controller based on a received control instruction so that the reconfigurable RF module controller performs a transmission operation or a reception operation.

5. The system for initializing an RF module through non-volatile control according to claim 4, further comprising an RF module selector configured to transmit a selection signal to the reconfigurable RF module controller based on a selection instruction from the processor so that the reconfigurable RF module controller reads the target configuration information from the non-volatile storage array and initializes a target RF module.

6. The system for initializing an RF module through non-volatile control according to claim 4, wherein the reconfigurable RF module controller is configured to control the front-end interface circuit to read data from the RF module and store the acquired data in the non-volatile storage array.

7. The system for initializing an RF module through non-volatile control according to claim 4, wherein:
the non-volatile storage array includes a non-volatile register array, and the non-volatile register array comprises a plurality of non-volatile flip-flops and one non-volatile read/write controller, and
the non-volatile read/write controller is configured to determine, when receiving the power-down instruction, a plurality of the non-volatile flip-flops that are assigned to back up the configuration information based on a data amount and/or complexity of the configuration information, and transmit the control signals in a predetermined time sequence to the assigned non-volatile flip-flops, thereby enabling the assigned non-volatile flip-flops to back up the configuration information.

8. The system for initializing an RF module through non-volatile control according to claim 4 wherein the reconfigurable RF module controller comprises:
a non-volatile FPGA configured to be programmed based on a type of a target RF module required to be initialized so that the front-end interface circuit used and the target RF module correspond to each other; and
a non-volatile programming information memory configured to store the programming information for the non-volatile FPGA, back up the programming information when receiving the power-down instruction, and restore the programming information when receiving the power-up instruction.

9. The system for initializing an RF module through non-volatile control according to claim 4 wherein the front-end interface circuit comprises:
  a data buffer configured to store the transmission or reception data sent to or read from the RF module; and
  a staticizer comprising:
    a frequency divider configured to generate the clock for a serial port and an input/output shifter from a system clock;
    the input/output shifter configured to generate serial or parallel signals; and
    a timing controller configured to synchronize the data and clock at the serial port and shape the waveforms of data signals complying with a given communication protocol.

10. The system for initializing an RF module through non-volatile control comprising:
  a non-volatile storage array configured to store configuration information for initializing the RF module, and back up the configuration information when receiving a power-down instruction; and
  a reconfigurable RF module controller configured to read the configuration information from the non-volatile storage array when receiving a power-up instruction, and transmit the read configuration information to a front-end interface circuit, wherein the front-end interface circuit is configured to transmit the configuration information to the RF module based on a given communication protocol, thereby initializing the RF module,
  wherein the front-end interface circuit is configured to be able to switch to use a type of front-end interface based on the target configuration information so that the type of front-end interface used corresponds to the target RF module.

* * * * *